(12) United States Patent
Kubo et al.

(10) Patent No.: US 8,064,111 B2
(45) Date of Patent: Nov. 22, 2011

(54) IMAGE SENSOR, IMAGE SENSOR UNIT, AND IMAGE READER

(75) Inventors: Satoshi Kubo, Ishikawa (JP); Kiyoto Kosaka, Ishikawa (JP)

(73) Assignee: PFU Limited, Ishikawa (JP)

( * ) Notice: Subject to any disclaimer, the term of this patent is extended or adjusted under 35 U.S.C. 154(b) by 581 days.

(21) Appl. No.: 12/022,593

(22) Filed: Jan. 30, 2008

(65) Prior Publication Data
US 2008/0285098 A1 Nov. 20, 2008

(30) Foreign Application Priority Data

May 18, 2007 (JP) ................................ 2007-133424

(51) Int. Cl.
*H04N 1/46* (2006.01)
(52) U.S. Cl. .................... 358/505; 358/524; 358/509
(58) Field of Classification Search .................. 358/514, 358/513, 512, 509, 505, 524; 382/318, 319
See application file for complete search history.

(56) References Cited

U.S. PATENT DOCUMENTS
5,315,413 A * 5/1994 Yamamoto et al. ........... 358/512

FOREIGN PATENT DOCUMENTS
JP 2000332960 11/2000
JP 2007-097054 A 4/2007

OTHER PUBLICATIONS
Japanese Office Action for Application No. 2007-133424 mailed Jul. 26, 2011.

* cited by examiner

*Primary Examiner* — Cheukfan Lee
(74) *Attorney, Agent, or Firm* — Lowe, Hauptman, Ham & Berner, LLP

(57) ABSTRACT

An image sensor includes a line sensor having sensor elements arranged in one line and configured to acquire, in each line cycle, R, G and B signals, when light sources, each corresponding to one of R, G and B colors, in the each line cycle, sequentially illuminate one after another in a predetermined order; a buffer having data saving units, each corresponding to one of the R, G and B colors; a controlling unit configured to generate, from the R, G and B signals, R, G and B data in each line cycle, and to add each of the R, G and B data in each cycle in a corresponding one of the data saving units; and an output unit configured to output to outside, as RGB line data, the R, G and B data in each line cycle that have been saved in the data saving units.

7 Claims, 6 Drawing Sheets

IMAGE SENSOR, IMAGE SENSOR UNIT, AND IMAGE READER

RELATED APPLICATIONS

The present application is based on, and claims priority from, Japan Application Number 2007-133424, filed May 18, 2007, the disclosure of which is hereby incorporated by reference herein in its entirety.

BACKGROUND OF THE INVENTION

1. Field of the Invention

The present invention relates to an image sensor, an image sensor unit and an image reader including a line sensor that carries out reading at the time of illumination of a light source of a respective R, G, B color.

2. Description of the Related Art

As indicated in Japanese Patent Application Laid-open No. 2007-097054, an image reader includes a one-line contact image sensor (CIS) that includes a line sensor in which active picture elements are linearly arranged in one line. In the image reader, a light source of a respective R, G, B color alternatingly illuminates and at the time of illumination of light sources, the one-line CIS reads an image reading medium. On every reading carried out by the line sensor, the one-line CIS generates R data, G data, and B data corresponding to R, G, B colors. In each line cycle, the generated R data, G data, and B data is output as RGB line data to a controller of the image reader. The controller generates image read data from the output RGB line data.

When the one-line sensor reads the image reading medium, the image reading medium moves towards the one-line CIS. Thus, a color of picture elements including the output RGB line data differs from a color of a portion corresponding to the image reading medium because a position of the image reading medium facing the one-line CIS changes at the time of illumination of the light sources. This creates a problem of color shifting. To be specific, the color shifting considerably occurs due to a low reading resolution and a fast moving speed of the image reading medium towards the one-line CIS and also due to significant changes in the position of the image reading medium facing the one-line CIS at the time of illumination of the light sources.

As a method to restrain the color shifting, the image sensor is considered that includes a line sensor in which sensor elements are linearly arranged in three lines. In other words, a three-line CIS is used. However, a three-line CIS is costlier than a one-line CIS. In other words, use of a three-line CIS in an image reader increase the cost of the image reader.

In the image reader using the one-line CIS, once the image reading medium is read using the reading resolution higher than a set reading resolution, the generated image read data can be interpolated in the image read data corresponding to the set reading resolution. However, if the image reading medium is read using the reading resolution higher than the set reading resolution, the moving speed of the image reading medium towards the one-line CIS becomes slower than the moving speed in the set reading resolution. Furthermore, a processing for interpolating the generated image read data in the set reading resolution also takes time. In other words, an image read data generation time, which is a time required till the image read data corresponding to the set reading resolution is generated after the scanning is started by the image sensor, will be lengthened.

SUMMARY OF THE INVENTION

It is an object of the present invention to at least partially solve the problems in the conventional technology.

According to an aspect of the present invention, an image sensor includes: a line sensor including sensor elements that are arranged in one line and are configured to acquire, in each line cycle, a plurality of R signals, a plurality of G signals, and a plurality of B signals, when light sources, each corresponding to one of R, G, and B colors, in the each line cycle, sequentially illuminate one after another in a predetermined order and repeat this sequential illumination in the predetermined order; and a buffer that includes data saving units, each corresponding to one of the R, G, and B colors; a controlling unit configured to generate, from the plurality of R signals, the plurality of G signals, and the plurality of B signals acquired by the sensor elements, a plurality of R data, a plurality of G data, and a plurality of B data in the each line cycle, and to add each of the plurality of R data, the plurality of G data, and the plurality of B data in the each cycle in a corresponding one of the data saving units; and an output unit configured to output to outside, as RGB line data, the plurality of R data, the plurality of G data, and the plurality of B data in the each line cycle that have been saved in the data saving units.

According to another aspect of the present invention, an image sensor unit includes: a light source unit that includes the light sources and is configured to illuminate light from the light sources to an image reading medium; the above image sensor; and an optical unit configured to direct light reflected from the image reading medium to the image sensor.

According to still another aspect of the present invention, sensors acquires multiple R, an image sensor unit includes: a light source unit configured to illuminate an image reading medium and including light sources, each corresponding to one of R, G, and B colors, the light sources being configured to, in each line cycle, sequentially illuminate one after another in a predetermined order and repeat this sequential illumination in the predetermined order; an image sensor that includes a line sensor including sensor elements that are arranged in one line and are configured to, in the each line cycle, acquire a plurality of R signals, a plurality of G signals, and a plurality of B signals when the light sources illuminate in the each line cycle; an optical unit configured to direct a light reflected from the image reading medium to the image sensor; a buffer that includes data saving units, each corresponding to one of the R, G, and B colors; a controlling unit configured to generate, from the plurality of R signals, the plurality of G signals, and the plurality of B signals acquired by the image sensor, a plurality of R data, a plurality of G data, and a plurality of B data in the each line cycle, and to add each of the plurality of R data, the plurality of G data, and the plurality of B data in the each line cycle in a corresponding one of the data saving units; and an output unit that outputs to outside, as RGB line data, the plurality of R data, plurality of G data, and plurality of B data in the each line cycle that have been saved in the data saving units.

According to still another aspect of the present invention, there is provided an image reader including the above image sensor unit, wherein the image sensor unit scans the image reading medium in a main scanning direction; a moving unit that relatively moves the image sensor unit and the image reading medium so that the image sensor unit can scan the image reading medium in a sub scanning direction; and a controller that generates image data based on the RGB line data output from the output unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are explained in detail below with reference to the accompanying drawings. The present invention is not limited to embodiments mentioned below. Constituent elements in the embodiments mentioned below include elements those one skilled in the art can easily assume or those are virtually identical.

In the embodiments mentioned below, as an image reader, an image scanner is explained. However, the present invention is not to image scanners. A copier, a facsimile, a character recognizing device can be used if scanning of an image reading medium is carried out by an image sensor. In the embodiments mentioned below, as the image scanner, an automatic document feeder scanner is explained that causes the image reading medium to move towards the image sensor, thereby relatively moving the image sensor and the image reading medium. The present invention is not to be thus limited. A flatbed scanner can also be used that causes the image sensor to move towards the image reading medium, thereby relatively moving the image sensor and the image reading medium.

Figure 1:
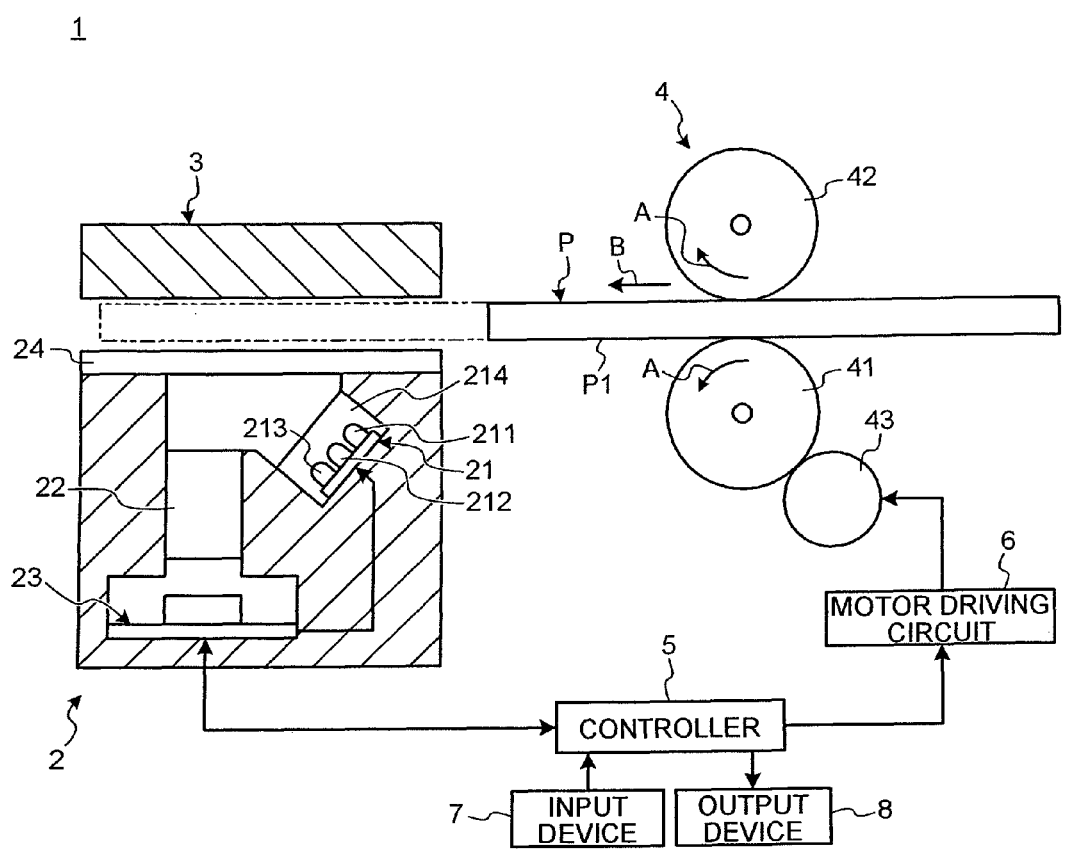
FIG. 1 is a schematic of an overview of an image reader according to an embodiment of the present invention.
Figure 2:
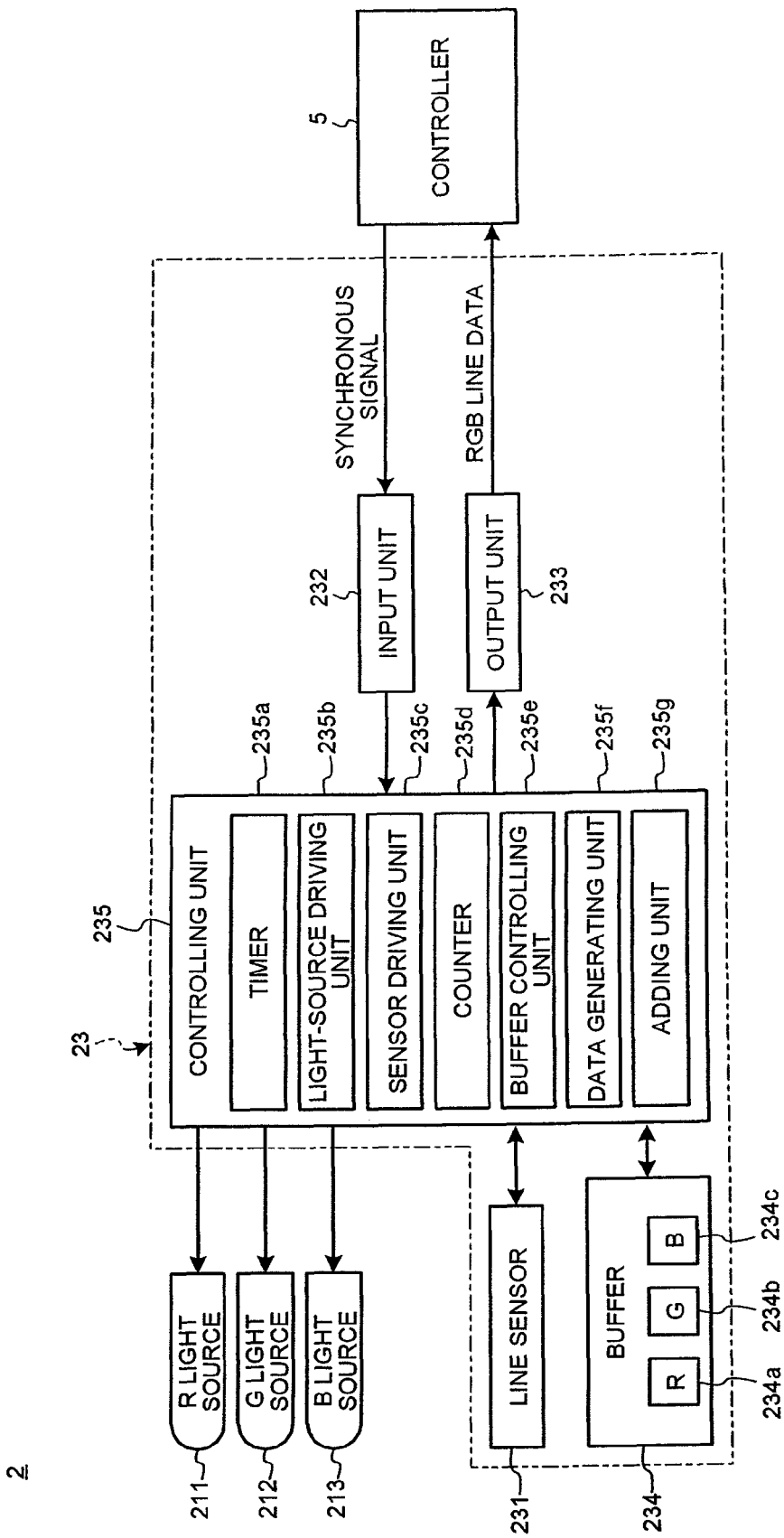
FIG. 2 is a block diagram of an image sensor unit shown in FIG. 1.

FIG. 1 is a schematic of an image reader 1 according to an embodiment of the present invention. FIG. 2 is a block diagram of an image sensor unit shown in FIG. 1. The image reader 1 includes an image sensor unit 2, a backing 3, a conveyer 4, a controller 5, a motor driving circuit 6 that drives a motor 43 of the conveyer 4, an input device 7, and an output device 8. The image reading medium is assumed to be a document P and a reading surface is assumed to be a printing surface P1. It is explained that in each line cycle, the light sources sequentially repeat and illuminate for two times and each data is respectively generated for two times in the line cycle. However, this should not be taken as limiting. In other words, in each line cycle, the light sources can be sequentially repeated and can be illuminated for more than or equal to three times and each data can be respectively generated for more than or equal to three times in the line cycle.

The image sensor unit 2 reads the printing surface P1 of the document P received from the conveyer 4. The image sensor unit 2, which is fixed to a not shown chassis of the image reader 1, scans the document P in a main scanning direction. The image sensor unit 2 includes a light source unit 21, a lens 22, and an image sensor 23. Furthermore, 24 is a transmission-supporting member such as a glass plate that transmits a light. The transmission-supporting member supports along with the backing 3, the document P sent by the conveyer 4.

The light source unit 21 irradiates a light of the light source on the document P. The light is irradiated on the document P, which is supported by the transmission-supporting member 24 and the backing 3. The light source unit 21 includes the light sources of R, G, B colors such as an R light source 211, a G light source 212, and a B light source 213, and a prism 214. When the R light source 211 is illuminated, a red light is emitted. When the G light source 212 is illuminated, a green light is emitted and when the B light source 213 is illuminated, a blue light is emitted. The R light source 211, the G light source 212, and the B light source 213 (hereinafter, simply called "light sources 211 to 213") are formed of light emitting diodes (LED). The light sources 211 to 213 are connected to a controlling unit 235. The controlling unit 235 controls illumination and extinction of the light sources 211 to 213. In other words, the controlling unit 235 carries out a light source driving control for the light sources 211 to 213. The prism 214 uniformly irradiates the light emitted by the light sources 211 to 213 on the document P facing the image sensor unit 2 in the main scanning direction (vertical direction with respect to a sheet surface shown in FIG. 1). In other words, from an entire area of the document P, the light emitted by the light sources 211 to 213 is irradiated via the prism 214 and the transmission-supporting member 24 on an area in the main scanning direction facing the image sensor unit 2.

The lens 22 causes the light reflected on the document P to fall on the image sensor 23. The lens 22 is formed of a lot lens array. The light of the light sources 211 to 213 reflected on the printing surface P1 of the document P passes through the lens 22 and an erected image of the printing surface P1 is displayed in a same size on a line sensor 231. The lens 22 is disposed between the image sensor 23 and the transmission-supporting member 24.

The image sensor 23 reads the printing surface P1 received from the conveyer 4. As shown in FIG. 2, the image sensor 23 includes the line sensor 231, an input unit 232, an output unit 233, a buffer 234, and the controlling unit 235. A basic structure of the image sensor 23 also includes a not shown plurality of sensor elements linearly arranged in one line, memories such as random access memory (RAM) and a read only memory (ROM), and a central processing unit (CPU).

In the line sensor 231, the sensor elements (image sensors) are linearly arranged in one line. Each sensor element is arranged in one line in the main scanning direction (the vertical direction with respect to the sheet surface in FIG. 1) facing the image sensor unit 2. On every exposure of each sensor element, the line sensor 231 outputs pixel data based on the light (the light of the light sources 211 to 213 reflected on the printing surface P1) fell via the lens 22 and reads the document P. The line sensor 231 is connected to the controlling unit 235. Each pixel data output by the line sensor 231 is input in the controlling unit 235. The controlling unit 235 carries out a driving control of the line sensor 231.

Various signals output by the controller 5 are input in the input unit 232. The input unit 232 is connected to the controlling unit 235 and the various signals, which are output from the controller 5 and input in the input unit 232, are input in the controlling unit 235. The signals input in the controlling unit 235 via the input unit 232 are synchronous signals deciding a timing for the controlling unit 235 to control the image sensor 23 and the light sources 211 to 213.

The output unit 233 externally outputs as the RGB line data in each line cycle, R saved data, B saved data, and G saved data saved in later described data saving units 234a to 234c. The output unit 233 is connected to the controlling unit 235 and the controlling unit 235 controls an output. Thus, the output unit 233 externally outputs the RGB line data to the controller 5 in each line cycle.

The buffer 234 includes the R data saving unit 234a, the G data saving unit 234b, and the B data saving unit 234c (hereinafter, simply called "data saving units 234a to 234c") respectively corresponding to R, G, B colors. The controlling unit 235 adds R data to the R data saving unit 234a and maintains as the R saved data, a total of all the added R data. In the R data saving unit 234a, all the R data generated by the controlling unit 235 is added and the total of all the added R data is maintained as the R saved data. In the G data saving unit 234b, all G data generated by the controlling unit 235 is added and a total of all the added G data is maintained as the G saved data. In the B data saving unit 234c, all B data generated by the controlling unit 235 is added and a total of all the added B data is maintained as the B saved data. In other words, the buffer 234 saves the R saved data, the G saved data, and the B saved data (hereinafter, simply called "each saved data") that is the respective total of later described added R data, G data, and B data generated by the controlling unit 235.

Upon the line sensor 231 carrying out reading, the controlling unit 235 generates data, in other words, the R data, the G data, and the B data (hereinafter, simply called "each data") respectively corresponding to R, G, B colors. According to R, G, B colors, the controlling unit 235 adds the generated each data to the data saving units 234a to 234c. The controlling unit 235 includes a timer 235a, a light-source driving unit 235b, a sensor driving unit 235c, a counter 235d, a buffer controlling unit 235e, a data generating unit 235f, and an adding unit 235g.

The timer 235a confirms an SH cycle and an illumination time based on the synchronous signals input from the input unit 232. The SH cycle decides the timing of an exposure of the not shown image sensors included in the line sensor 231. The illumination time is the time of the light sources 211 to 213 illuminated based on the SH cycle.

The light-source driving unit 235b carries out the light source driving control of the light sources 211 to 213. In other words, the light-source driving unit 235b controls illumination and extinction of the light sources 211 to 213. The light-source driving unit 235b sequentially repeats and illuminates the light sources 211 to 213. In each SH cycle, the light-source driving unit 235b sequentially repeats and illuminates the R light source 211, the G light source 212, and the B light source 213. When illuminating any one of the light sources 211 to 213, the light-source driving unit 235b carries out extinction of other two illuminated light sources.

The sensor driving unit 235c controls driving of the line sensor 231. In each SH cycle, the sensor driving unit 235c simultaneously exposes each not shown sensor element. In each SH cycle, the light sources 211 to 213 are sequentially repeated and illuminated. Thus, the sensor driving unit 235c simultaneously exposes each sensor element at the time of illumination of the light sources 211 to 213. The line sensor 231 reads the printing surface P1 in the main scanning direction at the time of illumination of the light sources 211 to 213. Due to this, the image sensor unit 2 scans the document P in the main scanning direction.

The counter 235d counts an illumination count of the light sources 211 to 213. In the embodiment, the counter 235d counts a total illumination count N of the light sources 211 to 213. In the embodiment, the total illumination count N in a one-line cycle is six because the light sources 211 to 213 respectively illuminate for two times.

The buffer controlling unit 235e controls the buffer 234. In the embodiment, the buffer 234 outputs to the output unit 233, each saved data saved in the data saving units 234a to 234c. Upon outputting each saved data to the output unit 233, the buffer controlling unit 235e deletes each saved data saved in the data saving units 234a to 234c.

Upon the line sensor 231 carrying out reading, the data generating unit 235f generates each data. Based on the pixel data output in each SH cycle by each not shown sensor element of the line sensor 231 that is input in the controlling unit 235, the data generating unit 235f generates the R data, the G data, and the B data respectively corresponding to R, G, B colors.

The adding unit 235g adds each data generated by the data generating unit 235f to the corresponding data saving units 234a to 234c. Upon the data generating unit 235f generating any one of the R data, the G data, and the B data, the adding unit 235g adds the generated data to the data saving units 234a to 234c according to R, G, B colors. Upon the data generating unit 235f generating the R data, the adding unit 235g adds the generated R data to the R data saving unit 234a. Upon the data generating unit 235f generating the G data, the adding unit 235g adds the generated G data to the G data saving unit 234b and upon the data generating unit 235f generating the B data, adds the generated B data to the B data saving unit 234c.

As shown in FIG. 1, along with the transmission-supporting member 24, the backing 3 supports the document P (shown by dashed-two dotted line in FIG. 1) conveyed by the conveyer 4. The backing 3 is disposed at a position facing the image sensor unit 2 and the document P is sandwiched between the backing 3 and the image sensor unit 2. A surface of the backing 3 facing the image sensor unit 2 is formed of a white color member.

The conveyer 4 is a relative moving unit causing the image sensor 23 and the document P to move relatively. The conveyer 4 conveys the document P up to the position that faces the image sensor 23. As shown in FIG. 1, the conveyer 4 includes two conveying rollers 41 and 42 those are facing each other and rotatably supporting, and the motor 43 that is a rotatably driving unit causing the conveying roller 41 to rotate. On rotation of the motor 43, the conveying roller 41 rotates in a direction of an arrow A shown in FIG. 1. Due to rotation of the conveying roller 41, the document P is inserted between the conveying rollers 41 and 42 and is conveyed in a convey direction shown by an arrow B (shown by dashed-two dotted line in FIG. 1). Thus, by repeatedly scanning the document P in the main scanning direction when the document P is relatively moved by the conveyer 4 in the convey direction towards the image sensor 23, the image sensor 23 can scan the printing surface P1 in the vertical scanning direction. The motor driving circuit 6 rotatably drives the motor 43. The motor driving circuit 6 is connected to the controller 5. The controller 5 controls the conveyer 4 to convey the document P in the convey direction. The controller 5 controls a moving speed of the document P moved by the conveyer 4 towards the image sensor 23.

The controller 5 controls the image reader 1 and reads the printing surface P1. The controller 5 also generates read image data corresponding to the printing surface P1. The controller 5 includes a not shown input-output unit, a processing unit, and a storage unit. The input-output unit, the processing unit, and the storage unit are interconnected. The input device 7 and the output device 8 are connected to the controller 5 via the input-output unit. The input device 7 instructs the image reader 1 to start reading of the document P, carries out settings such as reading resolution of the document P when the image reader 1 reads the document P, and inputs data. The input device 7 includes input devices such as a switch, a keyboard, a mouse, and a mike. The output device 8 displays the read image data generated from a plurality of RGB line data output to the controller 5 after the document P is scanned by the image sensor 23. The output device 8 is a cathode ray tube (CRT) or a liquid crystal display device. Furthermore, the generated read image data can be output to a not shown printer. The input device 7 and the output device 8 can be mounted on the image reader 1. When the image reader 1 includes a portion of a computer system, the input device 7 and the output device 8 can be mounted on a not shown terminal device including a portion of a computer system different from the image reader 1. When the input device 7 and the output device 8 are mounted on the not shown terminal device, the terminal device can access the image reader 1 by a wired or a wireless method.

Figure 3:
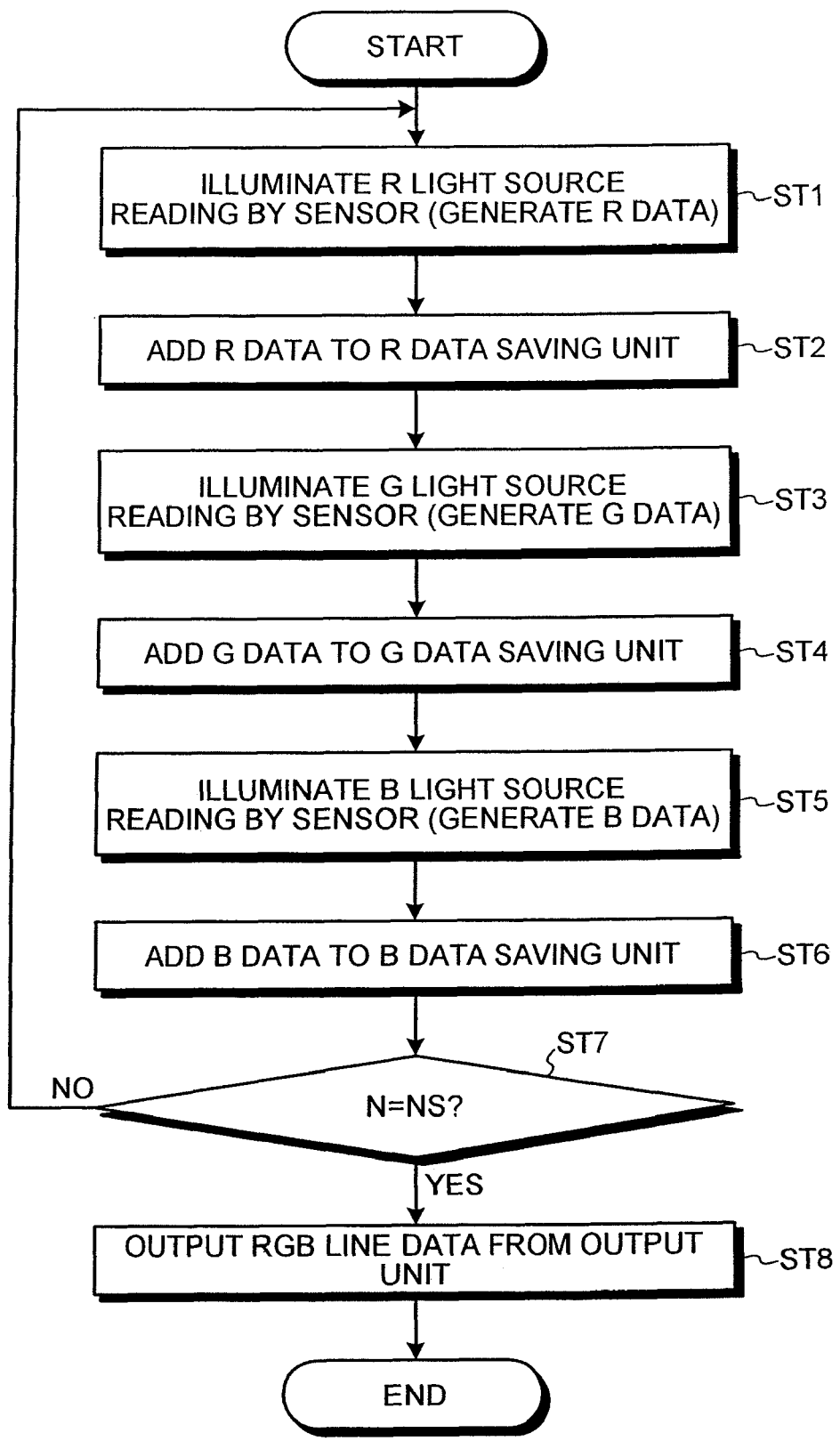
FIG. 3 is a flowchart of operations performed by light sources and an image sensor shown in FIG. 1.
Figure 4:
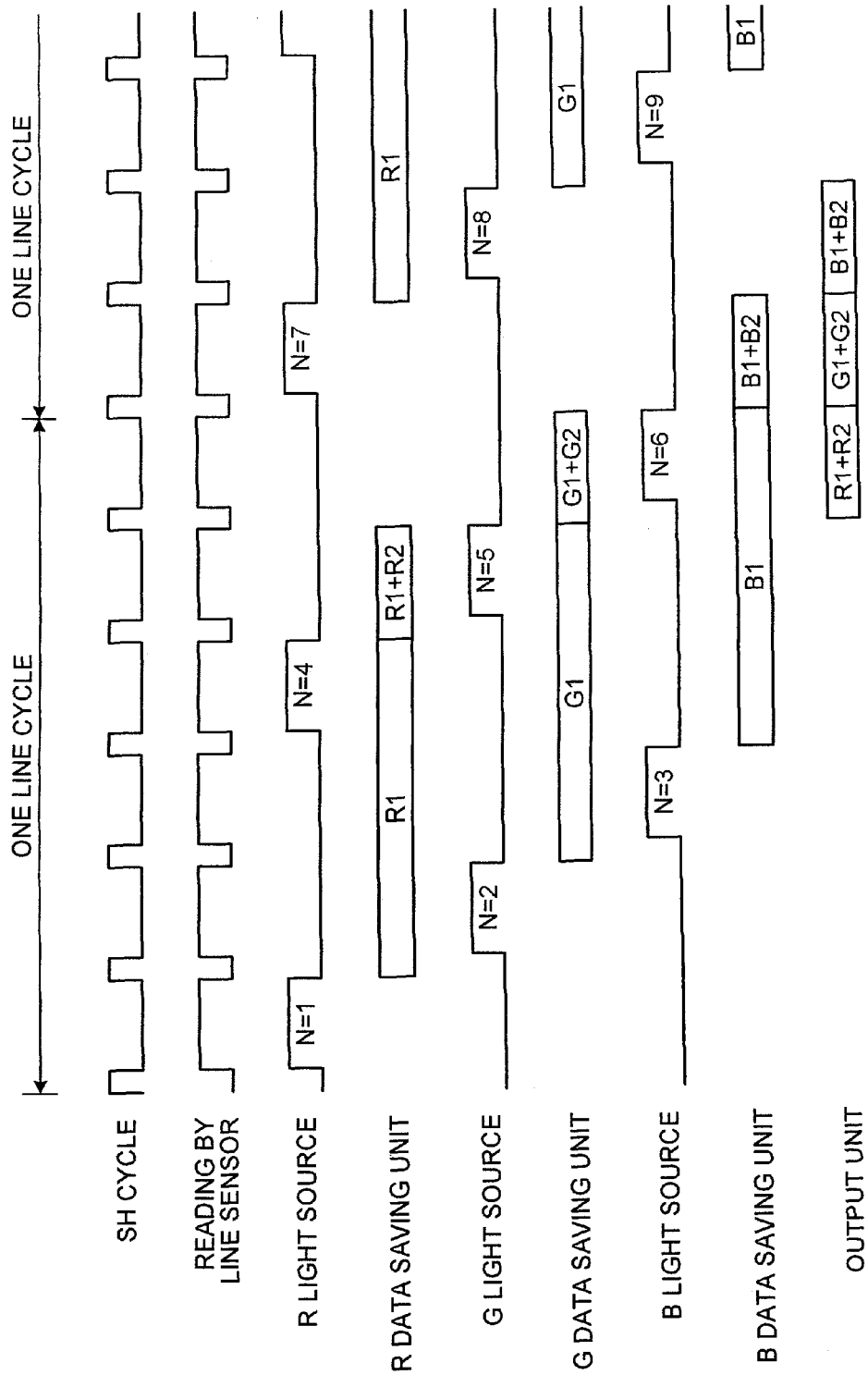
FIG. 4 is a time chart for explaining operations performed by the light sources and the image sensor.
Figure 5:
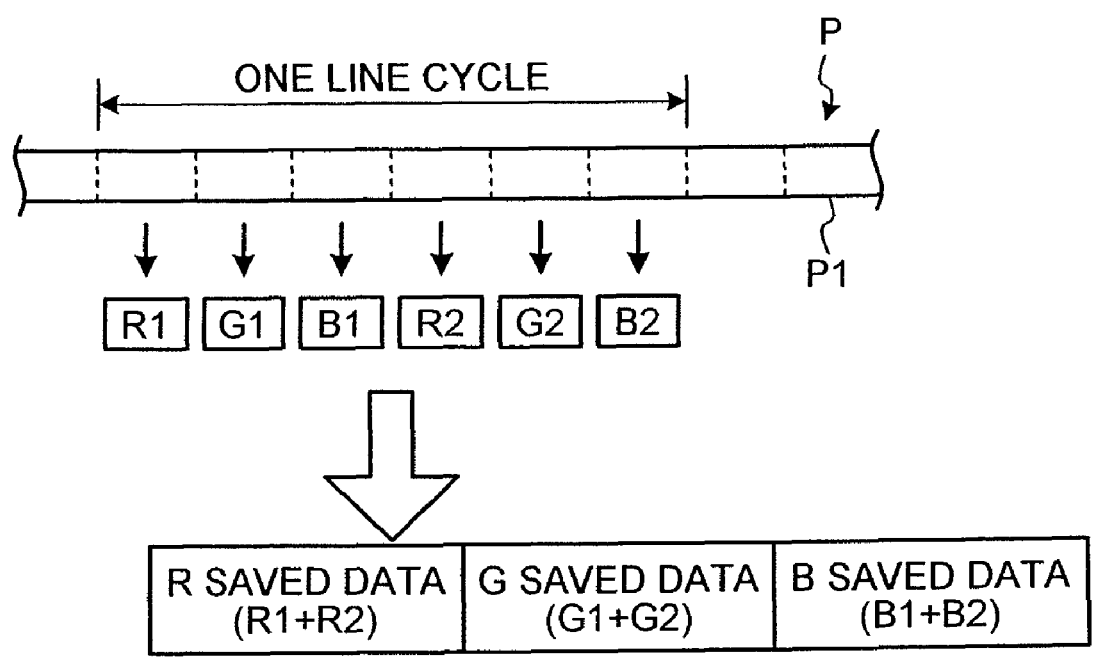
FIG. 5 is a schematic for explaining a relation between each data and a document reading position.

Operations performed by the image reader 1 according to the embodiment for reading the document P, especially, operations of the image sensor 23 are explained next. FIG. 3 is a flowchart of the operations performed by the light sources 211 to 213 and the image sensor 23 according to the embodiment. FIG. 4 is a time chart of the light sources 211 to 213 and the image sensor 23 according to the embodiment. FIG. 5 is a schematic indicating a relation between each data and a document reading position according to the embodiment.

Upon the image sensor 23 outputting the RGB line data in each line cycle and the controller 5, which includes the RGB line data of each line cycle, generating the read image data including data on the printing surface P1 of the document P, the image reader 1 reads the document P. Upon the image reader 1 starting reading of the document P, the controller 5 outputs the synchronous signals to the image sensor 23 and controls the driving of the conveyer 4. The controller 5 controls the driving of the conveyer 4 such that the moving speed of the document P towards the image sensor 23 will be the speed according to the set reading resolution that is prior set by the input device 7. For example, when the set reading resolution is low, as compared to the high set reading resolution, the moving speed of the document P towards the image sensor 23 will be faster, thereby increasing a gap between a position of the document P and the image sensor 23 in each line cycle.

The operations of the image sensor 23 when outputting the RGB line data in each line cycle are explained. As shown in FIG. 3, the light-source driving unit 235b illuminates the R light source 211 in a first SH cycle of each line cycle. Furthermore, in the first SH cycle of each line cycle, the sensor driving unit 235c reads the document P using the line sensor 231 (step ST1). As shown in FIG. 4, during the first SH cycle, the R light source 211 is illuminated and each not shown sensor element of the line sensor 231 is simultaneously exposed during the first SH cycle. Based on each pixel data that is input in the controlling unit 235 and that is output by each sensor element of the line sensor 231, the data generating unit 235f generates the R data, in other words, R1 data (the R data generated for the first time in the one-line cycle). Upon the light-source driving unit 235b illuminating the R light source 211, the counter 235d starts counting and considers the total illumination count N as one.

As shown in FIG. 3, the adding unit 235g adds the R1 data generated by the data generating unit 235f to the R data saving unit 234a (step ST2). As shown in FIG. 4, the adding unit 235g adds to the R data saving unit 234a, the R1 data generated by the data generating unit 235f in a second SH cycle of each line cycle. Because the R data is not saved in the R data saving unit 234a, R saved data becomes the R1 data.

As shown in FIG. 3, the light-source driving unit 235b illuminates the G light source 212 in a second SH cycle of each line cycle. Furthermore, in the second SH cycle of each line cycle, the sensor driving unit 235c reads the document P using the line sensor 231 (step ST3). As shown in FIG. 4, during the second SH cycle, the G light source 212 is illuminated and each not shown sensor element of the line sensor 231 is simultaneously exposed during the second SH cycle. Based on each pixel data that is input in the controlling unit 235 and that is output by each sensor element of the line sensor 231, the data generating unit 235f generates the G data, in other words, G1 data (the G data generated for the first time in the one-line cycle). Upon the light-source driving unit 235b illuminating the G light source 212, the counter 235d starts counting and considers the total illumination count N as two.

As shown in FIG. 3, the adding unit 235g adds the G1 data generated by the data generating unit 235f to the G data saving unit 234b (step ST4). As shown in FIG. 4, the adding unit 235g adds to the G data saving unit 234b, the G1 data generated by the data generating unit 235f in a third SH cycle of each line cycle. Because the G data is not saved in the G data saving unit 234b, G saved data becomes the G1 data.

As shown in FIG. 3, the light-source driving unit 235b illuminates the B light source 213 in a third SH cycle of each line cycle. Furthermore, in the third SH cycle of each line cycle, the sensor driving unit 235c reads the document P using the line sensor 231 (step ST5). As shown in FIG. 4, during the third SH cycle, the B light source 213 is illuminated and each not shown sensor element of the line sensor 231 is simultaneously exposed during the third SH cycle. Based on each pixel data that is input in the controlling unit 235 and that is output by each sensor element of the line sensor 231, the data generating unit 235f generates the B data, in other words, B1 data (the B data generated for the first time in the one-line cycle). Upon the light-source driving unit 235b illuminating the B light source 213, the counter 235d starts counting and considers the total illumination count N as three. Therefore, the light sources 211 to 213 are one by one sequentially illuminated, and each data is generated for one time.

As shown in FIG. 3, the adding unit 235g adds the B1 data generated by the data generating unit 235f to the B data saving unit 234c (step ST6). As shown in FIG. 4, the adding unit 235g adds to the B data saving unit 234c, the B1 data generated by the data generating unit 235f in a fourth SH cycle of each line cycle. Because the B data is not saved in the B data saving unit 234c, B saved data becomes the B1 data.

Next, the controlling unit 235 determines whether the total illumination count N of the counter 235d is equal to a predetermined count NS (step ST7). The predetermined count NS is the total illumination count N of the one-line cycle. In the embodiment, the predetermined count NS is six. As mentioned earlier, because the light sources 211 to 213 are one by one sequentially illuminated, the total illumination count N of the counter 235d becomes three. Thus, the controlling unit 235 determines that the total illumination count N of the counter 235d is not equal to the predetermined count NS (No at step ST7).

Thus, the light-source driving unit 235b again illuminates the R light source 211 in a forth SH cycle of each line cycle. The sensor driving unit 235c carries out reading using the line sensor 231 in the forth SH cycle of each line cycle (step ST1). As shown in FIG. 4, during the forth SH cycle, the R light source 211 is illuminated and each not shown sensor element of the line sensor 231 is simultaneously exposed. Based on each pixel data that is input in the controlling unit 235 and that is output by each sensor element of the line sensor 231, the data generating unit 235f generates the R data, in other words, R2 data (the R data generated for the second time in the one-line cycle). When the R light source 211 is illuminated by the light-source driving unit 235b, the counter 235d carries out the counting and the total illumination count N is considered as four.

As shown in FIG. 3, the adding unit 235g adds the R2 data generated by the data generating unit 235f to the R data saving unit 234a (step ST2). As shown in FIG. 4, the adding unit 235g adds the R2 data generated by the data generating unit 235f to the R data saving unit 234a in a fifth SH cycle of each line cycle. The R saved data becomes a total of the R1 data and the R2 data because the R1 data is already saved in the R data saving unit 234a. If the adding unit 235g adds all the generated R data to the R data saving unit 234a, as shown in FIG. 4, the buffer controlling unit 235e outputs the R saved data saved in the R data saving unit 234a to the output unit 233 and also deletes the R saved data saved in the R data saving unit 234a.

Moreover, as shown in FIG. 3, the light-source driving unit 235b again illuminates the G light source 212 in a fifth SH cycle of each line cycle. The sensor driving unit 235c carries out reading using the line sensor 231 in the fifth SH cycle of each line cycle (step ST3). As shown in FIG. 4, during the fifth SH cycle, the G light source 212 is illuminated and each not shown sensor element of the line sensor 231 is simultaneously exposed. Based on each pixel data that is input in the controlling unit 235 and that is output by each sensor element of the line sensor 231, the data generating unit 235f generates the G data, in other words, G2 data (the G data generated for the second time in the one-line cycle). When the G light source 212 is illuminated by the light-source driving unit 235b, the counter 235d carries out the counting and the total illumination count N is considered as five.

As shown in FIG. 3, the adding unit 235g adds the G2 data generated by the data generating unit 235f to the G data saving unit 234b (step ST4). As shown in FIG. 4, the adding unit 235g adds the G2 data generated by the data generating unit 235f to the G data saving unit 234b in a sixth SH cycle of each line cycle. The G saved data becomes a total of the G1 data and the G2 data because the G1 data is already saved in the G data saving unit 234b. If the adding unit 235g adds all the generated G data to the G data saving unit 234b, as shown in FIG. 4, the buffer controlling unit 235e outputs the G saved data saved in the G data saving unit 234b to the output unit 233 and also deletes the G saved data saved in the G data saving unit 234b.

Thus, as shown in FIG. 3, the light-source driving unit 235b again illuminates the B light source 213 in a sixth SH cycle of each line cycle. The sensor driving unit 235c carries out reading using the line sensor 231 in the sixth SH cycle of each line cycle (step ST5). As shown in FIG. 4, during the sixth SH cycle, the B light source 213 is illuminated and each not shown sensor element of the line sensor 231 is simultaneously exposed. Based on each pixel data that is input in the controlling unit 235 and that is output by each sensor element of the line sensor 231, the data generating unit 235f generates the B data, in other words, B2 data (the B data generated for the second time in the one-line cycle). When the B light source 213 is illuminated by the light-source driving unit 235b, the counter 235d carries out the counting and the total illumination count N is considered as six.

As shown in FIG. 3, the adding unit 235g adds the B2 data generated by the data generating unit 235f to the B data saving unit 234c (step ST5). As shown in FIG. 4, the adding unit 235g adds the B2 data generated by the data generating unit 235f to the B data saving unit 234c in a sixth SH cycle of each line cycle. The B saved data becomes a total of the B1 data and the B2 data because the B1 data is already saved in the B data saving unit 234c. If the adding unit 235g adds all the generated B data to the B data saving unit 234c, as shown in FIG. 4, the buffer controlling unit 235e outputs the B saved data saved in the B data saving unit 234c to the output unit 233 and also deletes the B saved data saved in the B data saving unit 234c. In other words, the buffer controlling unit 235e sequentially outputs to the output unit 233, each saved data, among each saved data saved in the data saving units 234a to 234c, in which the generated each data is being added.

As shown in FIG. 3, the controlling unit 235 determines whether the total illumination count N of the counter 235d is equal to the predetermined count NS, which is six (step ST7). As mentioned earlier, because the light sources 211 to 213 are sequentially illuminated for two times, the total illumination count N of the counter 235d becomes six. Thus, the controlling unit 235 determines that the total illumination count N of the counter 235d is equal to the predetermined count NS (Yes at step ST7).

Next, the controlling unit 235 externally outputs the RGB line data from the output unit 233 (step ST8). In the embodiment, when the total illumination count N of the counter 235d is six, in other words, in each line cycle, the controlling unit 235 outputs to the controller 5 as the RGB line data, each saved data that is already output to the output unit 233 and is saved in the data saving units 234a to 234c.

As shown in FIG. 5, in the one-line cycle, each of R data, G data, and B data generated by the data generating unit 235f are generated correspondingly to non-adjacent positions on the printing surface P1 of the document P. In other words, each of the R saved data, the G saved data, and the B saved data forming the RGB line data in one line cycle are a combination of R data, G data, or B data corresponding to a plurality of positions that are not adjacent to each other on the document P. Due to this, restraining the color shifting is possible as compared to RGB line data formed of R data, G data, and B data, each generated correspondingly to only one position on the document P in a line cycle.

In the image sensor 23, only by using a line sensor in which the not shown sensor elements are linearly arranged in one line, color shifting can be restrained and as compared to restraining the color shifting by using a line sensor in which the sensor elements are linearly arranged in three lines, an increment in a cost can also be restrained. Furthermore, without changing the moving speed of the document P towards the image sensor 23 in set reading resolution, the color shifting can be restrained. Furthermore, without performing the interpolation process, the read image data can be generated from the RGB line data, thereby enabling to restrain an increase in the read image data generation time.

The buffer controlling unit 235e sequentially outputs to the output unit 233, each saved data, among each saved data saved in the data saving units 234a to 234c, in which the generated each data is being added. Thus, even if each data is not added to another saved data, each saved data output to the output unit 233 can be deleted. Thus, as compared to adding the multiple each data to the data saving units 234a to 234c and outputting each saved data saved in the data saving units 234a to 234c to the output unit 233, each saved data saved in the data saving units 234a to 234c can be quickly deleted. Due to this, lengthening of the one-line cycle due to delayed deletion of the data saving units 234a to 234c can be restrained.

In the embodiment, the light-source driving unit 235b controls the light source driving of the light sources 211 to 213. However, the present invention is not to be thus limited. The light source driving of the light sources 211 to 213 can be carried out by an external device such as the controller 5.

Furthermore, without connecting via the controlling unit 235, the light sources 211 to 213 and the input unit 232 can be directly connected.

In the embodiment, an illumination count of the light sources 211 to 213 in each line cycle and a data generation count are fixed by the image sensor 23. However, the present invention is not to be thus limited. The illumination count of the light sources 211 to 213 and the data generation count can be arbitrarily set using the external device such as the controller 5.

The data that can be saved in the data saving units 234a to 234c can be analog data or digital data.

Figure 6:
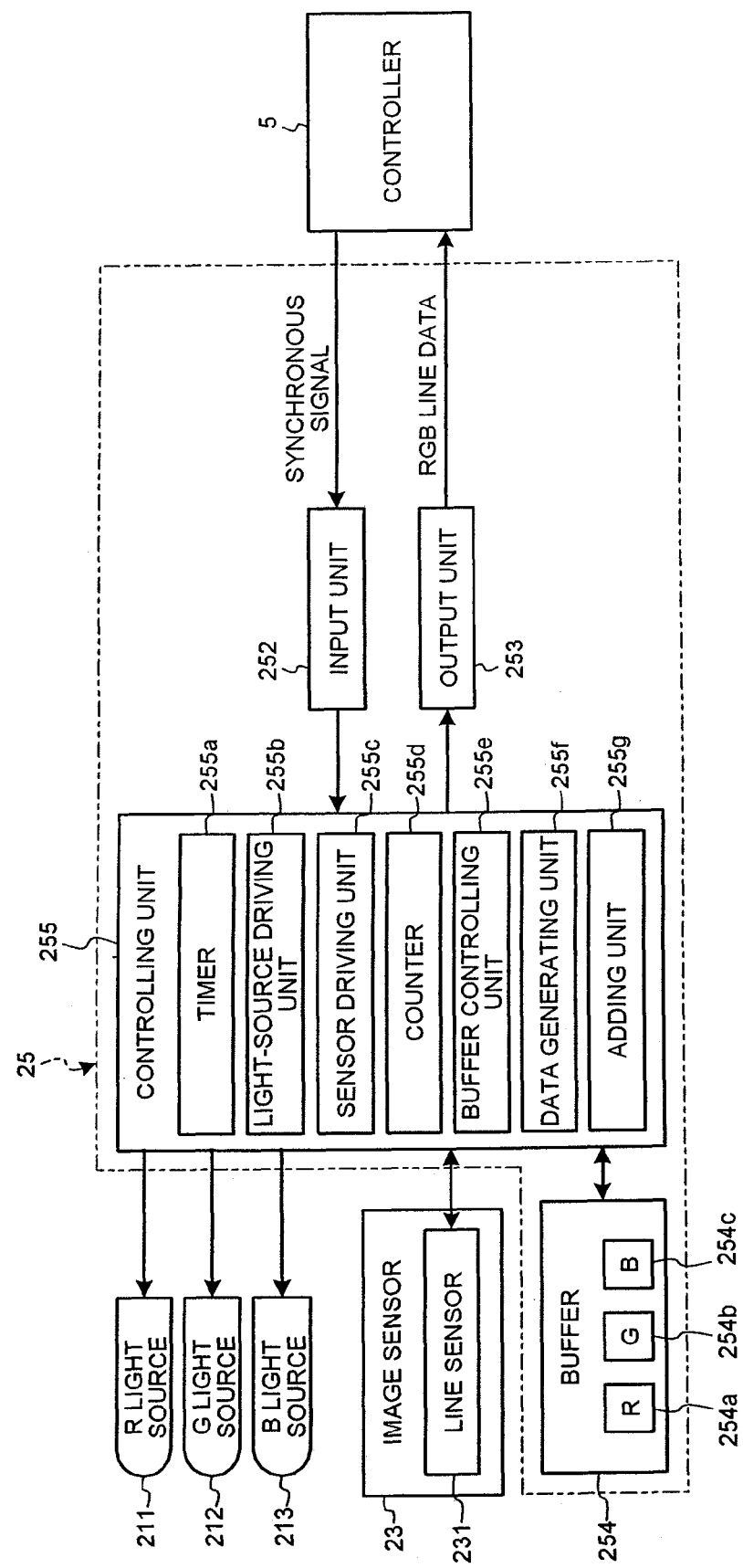
FIG. 6 is a block diagram of an image sensor unit according to another embodiment of the present invention.

In the above embodiment, the image sensor 23 includes the input unit 232, the output unit 233, the buffer 234, and the controlling unit 235. However, the present invention is not limited to the above embodiment. FIG. 6 is a block diagram of an image sensor unit 20 according to another embodiment of the present invention. The image sensor unit 20 includes an input unit 252, an output unit 253, a buffer 254, and a controlling unit 255 in a unit-controlling unit 25. In other words, the image sensor unit 20 includes the image sensor 23 formed of the light source unit 21, the lens 22, and the line sensor 231, the transmission-supporting member 24, and the unit-controlling unit 25. The buffer 254 includes an R data saving unit 254a, a G data saving unit 254b, and a B data saving unit 254c. Furthermore, the controlling unit 255 includes a timer 255a, a light-source driving unit 255b, a sensor driving unit 255c, a counter 255d, a buffer controlling unit 255e, a data generating unit 255f, and an adding unit 255g.

According to an aspect of the present invention, in a one-line cycle, each set of data generated by a controlling unit for any one of R, G, and B colors is generated correspondingly to non-adjacent positions on an image reading medium. In other words, in a line cycle, each of R saved data, G saved data, and B saved data forming RGB line data is a combination of data corresponding to a plurality of positions that are not adjacent to each other on the image reading medium. For example, in each line cycle, if light sources are sequentially illuminated repeatedly for two times, two R data, two G data, and two B data are generated in that line cycle. R1 data, G1 data, and B1 data generated first are respectively added to an R data saving unit, a G data saving unit, or a B data saving unit of a buffer. Furthermore, R2 data, G2 data, and B2 data generated second are added to the R saved data, the G saved data, and the B saved data (i.e., to the already saved R1 data, G1 data, and B1 data generated first) saved in the data saving units. An output unit externally outputs as the RGB line data in each line cycle, the R saved data, which is a total of the R1 data and the R2 data, the G saved data, which is the total of the G1 data and the G2 data, and the B saved data, which is the total of the B1 data and the B2 data. Due to this, color shifting can be restrained as compared to RGB line data formed of R data, B data, and G data, each generated correspondingly to only one position of the image reading medium in each line cycle.

In an image sensor, only by using a line sensor in which sensor elements are linearly arranged in one line, color shifting can be restrained and as compared to restraining the color shifting by using a line sensor in which the sensor elements are linearly arranged in three lines, an increment in a cost can also be restrained. Furthermore, without changing a moving speed of the image reading medium towards the image sensor in a set reading resolution, the color shifting can be restrained. Furthermore, without performing an interpolation process, read image data can be generated from the RGB line data, thereby enabling to restrain an increase in a read image data generation time.

Data saved in the data saving units of the buffer can be deleted if output to the output unit that externally outputs the RGB line data. The controlling unit sequentially outputs to the output unit, each saved data, among each saved data saved in data saving units, in which the generated each data is being added. Thus, even if multiple each data is not added to another saved data, each saved data output to the output unit can be deleted. Thus, as compared to adding the multiple each data to the data saving units of the buffer and outputting each saved data saved in the data saving units to the output unit, each saved data saved in the data saving units of the buffer can be quickly deleted. Due to this, lengthening of the one-line cycle due to delayed deletion of the data saving units can be restrained.

An image sensor, an image sensor unit, and an image reader according to the above embodiments can restrain a cost increment and an increase in read image data generation time. At the same time, color shifting can also be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image sensor, comprising:
a line sensor including sensor elements that are arranged in one line and are configured to acquire, in each line cycle, a plurality of R signals, a plurality of G signals and a plurality of B signals, when light sources, each corresponding to one of R, G and B colors, in the each line cycle, sequentially illuminate one after another in a predetermined order and repeat this sequential illumination in the predetermined order;
a buffer that includes data saving units, each corresponding to one of the R, G and B colors;
a controlling unit configured to generate, from the plurality of R signals, the plurality of G signals and the plurality of B signals acquired by the sensor elements a plurality of R data, a plurality of G data and a plurality of B data in each line cycle, and to add each of the plurality of R data, the plurality of G data and the plurality of B data in each cycle in a corresponding one of the data saving units; and
an output unit configured to sequentially output to outside, as RGB line data, the plurality of R data, the plurality of G data and the plurality of B data in each line cycle that have been saved in the data saving units, wherein
the plurality of R data is outputted immediately after the addition has been completed for the R data,
the plurality of G data is outputted immediately after the addition has been completed for the G data, and
the plurality of B data is outputted immediately after the addition has been completed for the B data.

2. The image sensor according to claim 1, wherein the controlling unit controls illumination and extinction of the light sources.

3. An image sensor unit comprising:
the image sensor according to claim 1;
a light source unit that includes the light sources and is configured to illuminate light from the light sources to an image reading medium;
an optical unit configured to direct light reflected from the image reading medium to the image sensor.

4. An image reader comprising:
the image sensor unit according to claim 3, wherein the image sensor unit is configured to scan the image reading medium in a main scanning direction;
a moving unit that is configured to relatively move the image sensor unit and the image reading medium so that the image sensor unit can scan the image reading medium in a sub scanning direction; and
a controller that is configured to generate image data based on the RGB line data output from the output unit.

5. An image sensor unit, comprising:
a light source unit configured to illuminate an image reading medium and including light sources, each corresponding to one of R, G and B colors, the light sources being configured to, in each line cycle, sequentially illuminate one after another in a predetermined order and repeat this sequential illumination in the predetermined order;
an image sensor that includes a line sensor including sensor elements that are arranged in one line and are configured to, in each line cycle, acquire a plurality of R signals, a plurality of G signals and a plurality of B signals when the light sources illuminate in each line cycle;
an optical unit configured to direct a light reflected from the image reading medium to the image sensor;
a buffer that includes data saving units, each corresponding to one of the R, G and B colors;
a controlling unit configured to generate, from the plurality of R signals, the plurality of G signals and the plurality of B signals acquired by the image sensor, a plurality of R data, a plurality of G data and a plurality of B data, in each line cycle and to add each of the plurality of R data, the plurality of G data and the plurality of B data in each line cycle in a corresponding one of the data saving units; and
an output unit that sequentially outputs to outside, as RGB line data, the plurality of R data, the plurality of G data and the plurality of B data in each line cycle that have been saved in the data saving units, wherein
the plurality of R data is outputted immediately after the addition has been completed for the R data,
the plurality of G data is outputted immediately after the addition has been completed for the G data, and
the plurality of B data is outputted immediately after the addition has been completed for the B data.

6. The image sensor unit according to claim 5, wherein the controlling unit controls illumination and extinction of the light sources.

7. An image reader comprising:
the image sensor unit according to claim 5, wherein the image sensor unit is configured to scan the image reading medium in a main scanning direction;
a moving unit that is configured to relatively move the image sensor unit and the image reading medium so that the image sensor unit can scan the image reading medium in a sub scanning direction; and
a controller that is configured to generate image data based on the RGB line data output from the output unit.

* * * * *